April 16, 1940.  C. P. YAGLOU  2,197,564
AEROLOGICAL INSTRUMENT
Filed Dec. 9, 1936  3 Sheets-Sheet 1

INVENTOR.
CONSTANTIN P. YAGLOU
BY Herman Seid
ATTORNEY.

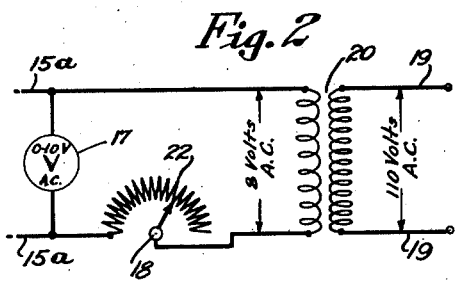
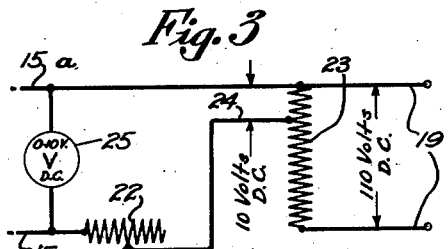
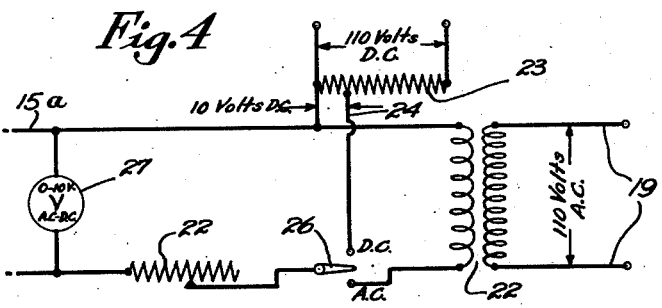
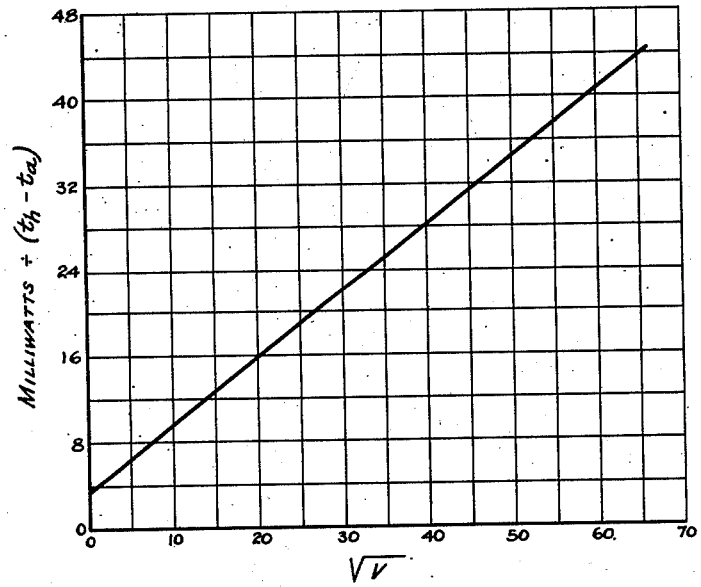

April 16, 1940.　　　C. P. YAGLOU　　　2,197,564
AEROLOGICAL INSTRUMENT
Filed Dec. 9, 1936　　3 Sheets-Sheet 3

INVENTOR.
CONSTANTIN P. YAGLOU
BY Herman Seid
ATTORNEY.

Patented Apr. 16, 1940

2,197,564

UNITED STATES PATENT OFFICE 2,197,564

AEROLOGICAL INSTRUMENT

Constantin P. Yaglou, Boston, Mass.

Application December 9, 1936, Serial No. 114,925

8 Claims. (Cl. 73—204)

This invention relates to aerological instruments, and more particularly, to apparatus for measuring the velocity of fluids such as air.

The general object of the invention is to provide an improved apparatus for measuring air velocities.

Heretofore, there has been known no practical anemometer capable of accurately measuring relatively low air velocities, particularly velocities between 0 and 100 feet per minute.

It is an object of the invention to provide an improved anemometer adapted readily and precisely to measure relatively low air velocities, and which is equally suitable for the measurement of higher velocities, up to 6,000 feet per minute and higher. The sensitivity of the instrument varies only slightly, from 0.5% or better at low air velocities to about 1% at high air velocities.

It is another object of the invention to provide an anemometer which is exceedingly simple to construct and to use, and which is markedly inexpensive.

It is another object of the invention to provide an anemometer in the use of which no time observations are required, and which is adapted to give rapid, as well as extremely accurate, readings.

It is another object of the invention to provide an anemometer which is small, compact, and self-contained, which may readily be carried about and set in operation by engineers or service men.

It is another object of the invention to provide an anemometer adapted for universal use, as inside air ducts, at the faces of registers and grilles, in areas now considered inaccessible for air flow measurement, in the open air, and within enclosures.

Another object is to provide an anemometer equally effective when measuring hot or cold currents, when placed at the suction or discharge sides of an impeller, and which does not require recalibration.

The invention is based upon the principle that the rate at which heat is dissipated from a given body or point is a function of the velocity of air in contact with said body or at said point. If a body which is supplied with heat at a constant rate is first in still air having a certain temperature, and then in moving air of the same temperature, the temperature of the body will be lower in the second case than in the first; and if the velocity of the moving air in increased, the temperature of the heated body will be correspondingly decreased. Accordingly, it will be understood that as the velocity of the air increases, the temperature of the heated body contacted thereby will more closely approach the temperature of the air. With a constant heat input to the body, a relatively great difference between the temperature of the air ($t_a$) and the temperature of the heated body ($t_h$) will indicate a relatively low air velocity, and a relatively small difference between the temperature of the air and that of the heated body will indicate a relatively high air velocity, the temperature difference ($t_h - t_a$) being inversely proportional to the square root of the air velocity.

An anemometer according to the invention may comprise a conventional glass thermometer around the bulb of which is wound enamel- or silk-covered wire of suitable resistance. The wire is preferably so wound as to cover the whole length of the bulb above the hemispherical end at the bottom. Leads from the heating element wound around the bulb are connected to binding posts suitably carried on the thermometer stem. The thermometer bulb is dipped in thin shellac before and after the heating element is wound, and when thoroughly dry after the second dipping, is well coated with glossy white enamel or the like, in order that it may reflect and be unaffected by radiant heat.

The binding posts carried on the thermometer stem are connected to any suitable source of electrical energy, such as a storage battery, dry cells or, as is preferred, the low voltage side of a bell transformer connected to a conventional high-voltage electrical distribution system. Any suitable means are provided to regulate the voltage impressed on the heating element, and hence the heat input to the bulb and preferably to maintain such heat input constant; for example, a voltmeter may connect across the binding posts and a variable resistance is placed in series with the heating element. By means of the voltmeter and variable resistance, the current through the heating element, and hence the heat input to the thermometer bulb, may be maintained constant. Preferably, the voltmeter, variable resistance and transformer are assembled in a small cabinet, having suitable electrical outlets for connection to the source of current and to the thermometer. Since the control cabinet is very small and light, and since the thermometer also is small and light, applicant's anemometer is very compact. It may be easily transported, and set in operation by merely plugging in to a source of electrical current.

In practice, a low voltage, of the order of 3 volts, impressed upon the heating element has been found suitable for the measurement of velocities up to 500 feet per minute, especially between 0 and 25 feet per minute. A voltage of about 5 volts is suitable for the measurement of velocities up to about 1500 feet per minute. For velocities about 1500 feet per minute, 9 or more volts should be used. For general ventilation work the most practical voltage has been found to be about 5 volts. With a low voltage, the sensitivity of the anemometer decreases as the velocity of the air increases, but by raising the voltage for the higher air velocities, as indicated, good sensitivity is obtained throughout the entire velocity range. At low velocities, low voltages are preferably employed not only because they make for increased sensitivity, but also because high voltages at low velocities would be apt to introduce errors from natural convectional currents set up by the heated bulb, even when the thermometer is held in a horizontal position.

When the anemometer is placed in an air stream whose velocity is to be measured, the reading of the heated thermometer is compared with the temperature of the air stream, and from this difference in readings, the air velocity may be directly determined by reference to a calibration chart or table. The temperature of the air stream may be measured by a conventional thermometer or by the heated thermometer before electricity is supplied thereto.

Other objects, features and advantages of the invention will be more apparent from the following description, to be read in connection with the accompanying drawings, in which:

Fig. 2 is a wiring diagram illustrating the connection of the anemometer to a source of high voltage alternating current;

Fig. 3 is a wiring diagram illustrating the connection of the anemometer to a source of high voltage direct current;

Fig. 4 is a wiring diagram of a circuit arrangement for selectively connecting the anemometer to a source of high voltage alternating current or to a source of high voltage direct current;

Fig. 5 is a graph in which the heat input to the bulb divided by the temperature difference is plotted against the square root of the air velocity;

Figure 1:
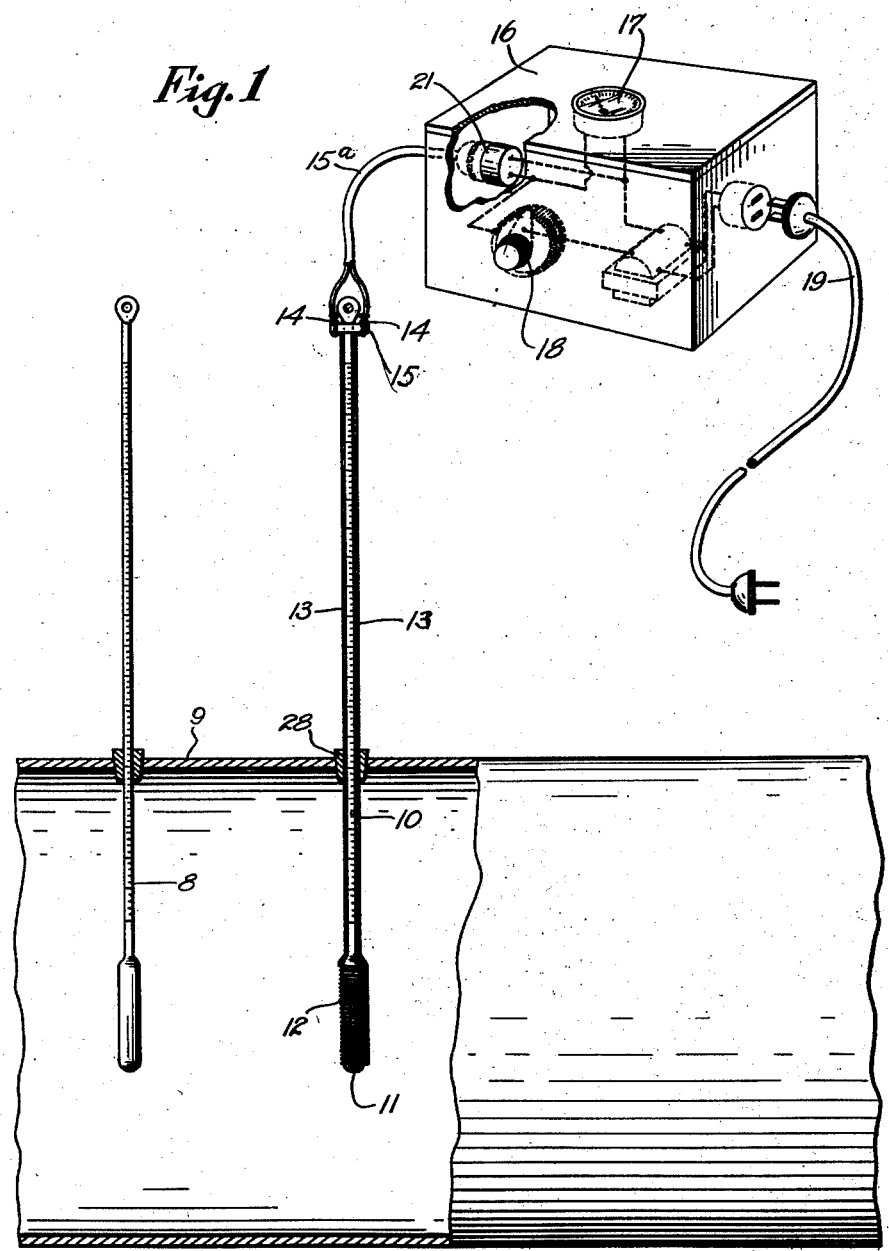
Fig. 1 illustrates a heated thermometer anemometer, in accordance with the invention, and its associated control box.

Referring now to the drawings, similar numerals referring to similar parts, the numeral 10 designates a conventional glass thermometer having a length of approximately twelve inches, and having a bulb 11 of approximately ¼ x ¾″. Wound about the bulb, and completely covering the same except for its rounded end, is a heating coil 12 of silk- or enamel-covered resistance wire. Number 35 double silk covered "advance" wire has been found to give satisfactory results. The wire is shellacked after it has been wound in place, and, after it has dried, is well coated with white glossy enamel, which is baked by supplying electricity to the wire. Leads 13, one from each end of the heating coil, are run along the thermometer and connected to binding posts or the like 14, suitably mounted on member 15, carried on the thermometer stem. Member 15 is preferably formed of rubber or other electrically insulating material. Leads 13 are preferably shellacked to the thermometer stem or are secured thereto by adhesive material of any desired type. While the leads 13 constitute a continuation of the heating coil and are formed of resistance wire, low resistance leads connected between the binding posts and the resistance heating coil may be used instead, but this would necessitate making two extra soldered connections.

Connected to the binding posts 14 by leads 15a is control box 16, provided with a voltmeter 17 and resistance-control knob 18. Control box 16 is connected to a suitable source of electrical energy by leads 19.

When the anemometer is to be operated on alternating current, the circuit arrangement of Fig. 2 may be used. In this case the leads 19 are connected to the high voltage terminals of a bell transformer 20, positioned within cabinet 16. A secondary voltage of approximately 8–10 volts is developed across the secondary coil terminals. One of the secondary coil terminals is connected to one element of cabinet outlet 21. The other secondary coil terminal leads to the other element of cabinet outlet 21 through variable resistance 22, of from 100 to 200 ohms, controlled by knob 18. A. C. voltmeter 17 is connected across the elements of cabinet outlet 21 and so measures the voltage impressed on the heating coil 12.

When the anemometer is to be operated on direct current, the circuit arrangement of Fig. 3 may be used. In this case a resistance 23 of about 1,000 ohms is connected across a 110 v. D. C. line. One end of the resistance 23 is connected to one of the binding posts 14. Resistance 23 is tapped by line 24 to provide approximately a 10 v. potential, and line 24 is connected to the other binding post 14 through variable resistance 22, used to control the voltage impressed on the heating coil. A D. C. voltmeter 25 is provided to measure the voltage impressed on the heating coil.

Fig. 4 illustrates an A. C.—D. C. circuit arrangement in which a switch 26 is used to shift from A. C. to D. C. Voltmeter 27 is of the A. C.—D. C type.

The instrument, when assembled and connected to a suitable source of electrical current, is then ready for calibration. For velocities between 0 and 200 feet per minute, calibration may be effected by the "swinging arm" method. For velocities between 200 and 1,000 feet per minute, the orifice meter method is employed, and for velocities above 1,000 feet per minute the pitot tube method is used.

In the swinging arm method the thermometer is attached to an arm which is rotated at a predetermined and known speed. Knowing the speed of angular rotation and the radius through which the thermometer rotates, the linear velocity of the thermometer anemometer may readily be determined. Readings are taken at different linear velocities, as by changing the angular velocity or by changing the radius, or both. These different readings of the thermometer anemometer at different velocities indicate, for any given votage impressed on the heating element, what the velocity is when the thermometer anemometer readings are at different points. In the pitot tube method, the anemometer is calibrated again by subjecting the anemometer to known fluid velocity conditions. In this case, the test velocities are measured by means of a pitot tube. As is well known, temperature and pressure in fluid flow are interrelated, and by taking pitot tube readings to determine the pressure, the velocity of fluid flow may readily be determined. By changing the rate of fluid flow and noting the corresponding changes in the reading of the thermometer anemometer, the latter may be calibrated.

In determining the constants of the heated bulb anemometer there were tested a variety of thermometers of the same type as described above, made by different manufacturers but having bulbs of about the same dimensions— $\frac{3}{32}$" to $\frac{1}{4}$" in diameter and $\frac{5}{8}$" to 1" in length. These instruments were standardized by determining the milliwatts supplied to the bulbs (not including energy wasted in overcoming resistance of the leads to the binding posts) at different voltages between 3 v. and 12 v., using an accurate voltmeter and milliameter.

In Fig. 5 are plotted values of the ratio $$\frac{\text{milliwatts input to bulb}}{(t_h - t_a)} \text{ against } \sqrt{V}$$

obtained from tests of the various instruments with voltages between 3 and 12, and air velocities from 0–4500 feet per minute. The relationship is linear for all practical purposes and may be represented by the following equation:

Milliwatts input to bulb $= (K_0 + K_1\sqrt{V})(t_h - t_a)$ (1)

where $K_0$ = the intercept with the vertical axis when V=0, and $K_1$ = the slope of the line.

For the various instruments tested $K_0$=3.4 and $K_1$=0.62, so that the equation becomes:

$$\left(\frac{\text{milliwatts input to bulb}}{t_h - t_a}\right) = 3.4 + 0.62\sqrt{V} \quad (2)$$

From this equation the air velocity can be computed, knowing the temperature differential, the impressed voltage and the resistance of the bulb heating element.

It has been found that if reasonable care is taken in the manufacture of the thermometer bulbs to make them all approximately the same within $\frac{1}{16}$", the instruments can be made "self-standard" requiring no individual calibration, but controlled by Equation 2. When thermometers of different sizes are used (as they may be, for the invention is not restricted to thermometers of any particular size or type) their constants $K_0$ and $K_1$ may be determined by plotting a curve similar to that of Fig. 5.

Figure 6:
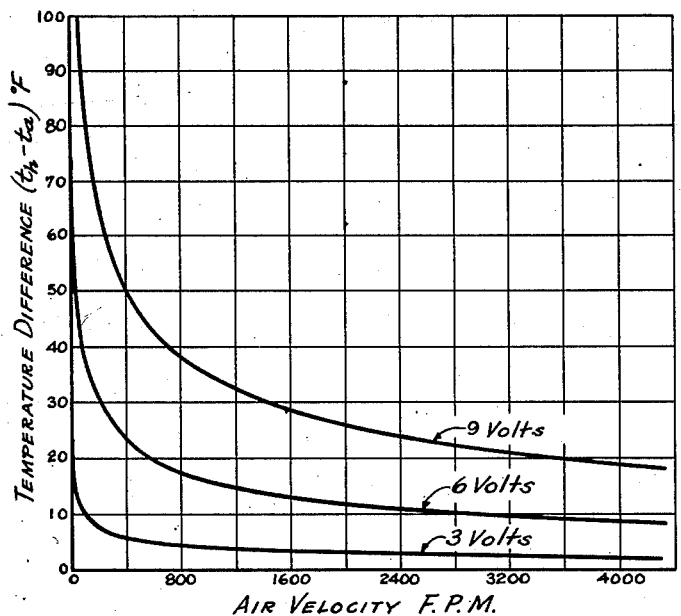
Fig. 6 is a graph in which temperature difference ($t_h - t_a$) is plotted against air velocity.

In Fig. 6 is shown the relationship between $(t_h - t_a)$ and V, for voltages of 3ᵛ, 6ᵛ and 9ᵛ impressed on the same instrument. These curves clearly demonstrate the extreme sensitivity of the anemometer at low velocities, and the desirability of increasing the voltage when higher air velocities are to be measured. It is to be observed in connection with the curves of Fig. 6 that the relationship between temperature differential and velocity, as shown thereby, is not affected by changes in the temperature of the air or by usual changes in barometric pressure.

Curves similar to those shown in Fig. 6 can be plotted from Equation 2 for any thermometer having a tolerance of not more than $\frac{1}{16}$", as above described, and whose resistance is known. Once these curves are drawn, measuring air velocities can be done simply by taking two thermometer readings, finding the temperature differential, and reading across to and down from the proper voltage curve.

To measure air velocities within a duct or the like, the anemometer is inserted within the duct through a small hole or opening formed therein. As shown in Fig. 1, a rubber stopper or the like, 28, positioned about the stem of the anemometer, serves to plug the hole and to hold the anemometer in desired position within duct 9. Similarly mounted within the duct is a conventional thermometer 8, preferably spaced from the anemometer by a distance of about six inches. To determine the air velocity within the duct, the reading of the conventional thermometer is substracted from the reading of the heated thermometer and this difference is read across to and down from a curve such as shown in Fig. 6, plotted for the voltage impressed on the heating coil of the anemometer. When measuring air velocities in ducts more than 24 inches in diameter, an extension stem of any desired type may be employed.

Figure 7:
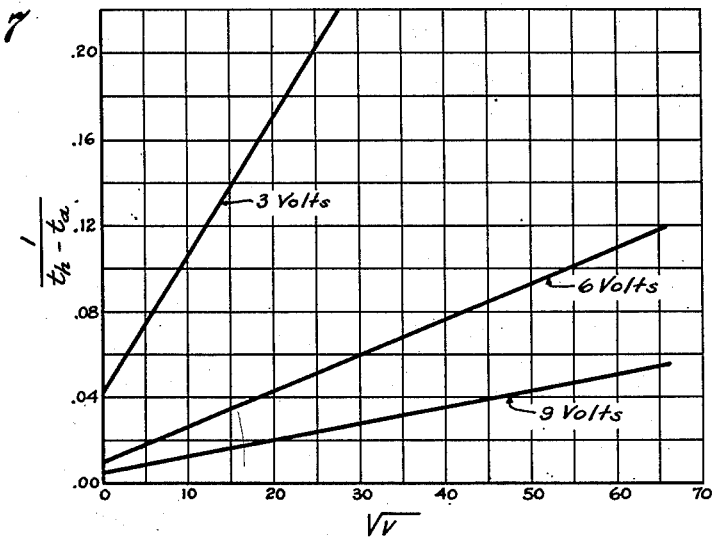
Fig. 7 is a graph in which the reciprocal of temperature difference ($t_h - t_a$) is plotted against the square root of air velocity.

In Fig. 7 the reciprocal of the temperature difference is plotted against $$\sqrt{V}$$

giving a series of straight line characteristics for the different voltages employed.

In measuring low air velocities or turbulence (5–25 F. P. M.) in enclosures, the anemometer is preferably clamped on a stand in a horizontal position at the point where the velocity is to be measured. The air temperature may be obtained by an ordinary thermometer about 6" away from the heated thermometer, or by the heated thermometer itself before it is supplied with electricity. The use of a separate thermometer is preferred, however. In air currents exceeding 15 feet per minute it does not seem to make appreciable difference whether the instrument is positioned horizontally or vertically, except that in the case of a descending air current having a velocity of less than 30 feet per minute the instrument should be held horizontally.

While the invention has been described with particular reference to the measurement of air velocities, it is to be understood that it may be employed to measure the velocity of other gases and liquids.

Since many modifications of and changes in the invention may be made without departing from the scope thereof, it is intended that the above description and accompanying drawings be regarded as illustrative only, and not in a limiting sense, applicant limiting himself only as indicated in the appended claims.

I claim:

1. An anemometer comprising a thermometer having a bulb containing an expansible medium, an electric heating element at least partially encasing said bulb and adapted to heat said bulb, and means adapted and arranged to supply electrical energy to said heating element at a predetermined constant rate.

2. An anemometer comprising a thermometer having a bulb, a resistance coil wound around said bulb, and means adapted and arranged to supply electric current to said coil at a predetermined constant rate.

3. An anemometer apparatus comprising a first thermometer adapted to measure the temperature of the fluid whose velocity is to be measured, a second thermometer adapted to be contacted by said fluid, electrical heating means in intimate thermal contact with said second thermometer, and means adapted and arranged to supply electric current to said heating means at a predetermined constant rate.

4. An anemometer comprising a thermometer adapted to be contacted by fluid whose velocity is to be measured, electrical heating means in intimate heat exchange relation with said thermometer adapted to heat the same, and means adapted and arranged to supply electrical energy to said heating means at a predetermined and substantially constant rate.

5. An anemometer comprising a thermometer having a bulb and of the type containing a fluid adapted to expand with increases in the temperature of said fluid, a resistance heating coil wound upon said bulb, and means for supplying electrical energy to said coil.

6. In an apparatus for measuring the velocity of fluids such as air, a bulb containing a fluid adapted to expand upon the application of heat thereto, means for measuring the expansion of said fluid, heating means wound upon said bulb and means for supplying energy to said heating means at a substantially constant rate.

7. In an apparatus for measuring the velocity of fluids such as air, a bulb containing a fluid adapted to expand upon the application of heat thereto, means for measuring the expansion of said fluid, heating means supported by said bulb and adapted to heat said bulb, and means for supplying energy to said heating means at a substantially constant rate.

8. In an apparatus for measuring the velocity of fluids such as air, a bulb containing a fluid adapted to expand upon the application of heat thereto, means for measuring the expansion of said fluid, a resistance coil mounted upon and in intimate thermal contact with said bulb and adapted to heat said bulb, and means arranged to supply electrical energy to said coil at a substantially constant rate.

CONSTANTIN P. YAGLOU.